US012698695B2

(12) United States Patent
Shors et al.

(10) Patent No.: US 12,698,695 B2
(45) Date of Patent: Aug. 4, 2026

(54) SYSTEMS AND METHODS FOR SEQUESTERING ALKALINE CARBONATES WITH CAPTURED CO₂

(71) Applicant: Capture6 Corp., Berkeley, CA (US)

(72) Inventors: Luke Shors, Rotorua (NZ); Jeanine Ash, Seattle, WA (US); Alishan Salim, Spring, TX (US); David Sheh, Oakland, CA (US); Rahul Surana, Fremont, CA (US)

(73) Assignee: Capture6 Corp, Berkeley, CA (US)

( * ) Notice: Subject to any disclaimer, the term of this patent is extended or adjusted under 35 U.S.C. 154(b) by 0 days.

(21) Appl. No.: 18/919,246

(22) Filed: Oct. 17, 2024

(65) Prior Publication Data

US 2025/0122780 A1     Apr. 17, 2025

Related U.S. Application Data

(60) Provisional application No. 63/590,964, filed on Oct. 17, 2023.

(51) Int. Cl.
E21B 41/00          (2006.01)
(52) U.S. Cl.
CPC .......... E21B 41/0064 (2013.01); *Y02C 20/40* (2020.08)
(58) Field of Classification Search
None
See application file for complete search history.

(56) References Cited

U.S. PATENT DOCUMENTS

2005/0011770 A1     1/2005  Katsuyoshi et al.
2008/0031801 A1*    2/2008  Lackner .................. C01F 11/18
                                                          62/602
(Continued)

FOREIGN PATENT DOCUMENTS

CN        107268027 A      10/2017
DE        4326757 A1        2/1994
(Continued)

OTHER PUBLICATIONS

Song, Kyungsun , et al., "Separation of sodium hydroxide from post-carbonation brines by bipolar membrane electrodialysis (BMED)", Chemical Engineering Journal, vol. 423, Apr. 1, 2021.
(Continued)

*Primary Examiner* — Andrew Sue-Ako
(74) *Attorney, Agent, or Firm* — Dentons Davis Brown; Matthew Warner-Blankenship

(57) ABSTRACT

A method for sequestering carbon dioxide (CO₂) includes receiving an alkaline fluid stream and receiving an acidic stream. The alkaline fluid stream and the acidic stream are produced by a direct air carbon capture process and the carbonate includes air-captured CO₂. The method also includes producing a pH balanced CO₂ stream by mixing the alkaline fluid stream with an acidic mixing portion comprising 0% up to 100% of the acidic stream, and storing the pH balanced CO₂ stream in a storage location. The storage location can include at least one of a subsurface location, on land, or in a water body. The storage location and the pH balanced CO₂ stream are configured to provide long-term storage of the air-captured CO₂.

15 Claims, 13 Drawing Sheets

(56)        References Cited

U.S. PATENT DOCUMENTS

| | | | |
|---|---|---|---|
| 2013/0034489 A1 | 2/2013 | Gilliam et al. | |
| 2013/0266380 A1 | 10/2013 | Capron et al. | |
| 2016/0362800 A1* | 12/2016 | Ren ..................... C25B 11/073 | |
| 2017/0191173 A1 | 7/2017 | Han et al. | |
| 2022/0219112 A1 | 7/2022 | Carbfix et al. | |
| 2022/0381122 A1 | 12/2022 | Pope et al. | |
| 2023/0126394 A1* | 4/2023 | Bush ......................... C25B 9/65 | |
| | | | 205/555 |
| 2023/0191322 A1 | 6/2023 | Shors et al. | |
| 2023/0406735 A1 | 12/2023 | Lieftinck et al. | |

FOREIGN PATENT DOCUMENTS

| | | |
|---|---|---|
| IE | 922650 A1 | 3/1994 |
| JP | 2008510600 A | 4/2008 |
| KR | 20150080687 A | 7/2015 |
| WO | 2011081254 | 7/2011 |
| WO | 20110102868 A1 | 8/2011 |
| WO | 2021061213 A2 | 4/2021 |

OTHER PUBLICATIONS

Bang, Jun-Hwan , et al., "CO2 Mineralization Using Brine Discharged from a Seawater Desalination Plant", minerals, vol. 7, 207, Oct. 30, 2017, 2-12.

Chen, Tianyi , et al., "Application of bipolar membrane electrodialysis for simultaneous recovery of high-value acid/alkali from saline wastewater: An in-depth review", Water Research, vol. 226, Oct. 19, 2022.

* cited by examiner

SYSTEMS AND METHODS FOR SEQUESTERING ALKALINE CARBONATES WITH CAPTURED CO₂

CROSS-REFERENCE TO RELATED APPLICATION(S)

This application claims the benefit under 35 U.S.C. § 119(e) to U.S. Provisional Application 63/590,964, filed Oct. 17, 2023, and entitled "APPARATUS, SYSTEMS, AND METHODS FOR SEQUESTRATION OF ALKALINE CARBONATES, EMBEDDED WITH CAPTURED CO₂ AND NEUTRALIZED WITH ACID, IN SUBSURFACE LOCATIONS AND WATER BODIES ON LAND," which is hereby incorporated herein by reference in its entirety.

TECHNICAL FIELD

The disclosed technology generally relates to storing and sequestering carbon dioxide ($CO_2$), and more particularly relates to storing and sequestering $CO_2$ in subsurface locations and in water bodies on land.

BACKGROUND

Assessments performed by the Intergovernmental Panel on Climate Change (IPCC) based on science-based climate modeling suggest society needs to perform up to 10 gigatons of annual removal and permanent storage of atmospheric $CO_2$ by 2050 to stay within the 1.5° C. warming threshold established under The Paris Agreement. This massive target for carbon removal is in addition to storage needed for carbon capture and sequestration (CCS). The scale of storage needs suggests a need for storage options that are inexpensive, appropriate for multiple carbon removal and/or capture technologies, not limited in scale, and geographically diverse to support decarbonization globally.

Current practices for long-term $CO_2$ storage through subsurface injection involve injecting supercritical $CO_2$, seltzer, or gaseous $CO_2$. Supercritical $CO_2$ is created by the temperature and pressure manipulation of a concentrated stream of $CO_2$, resulting in $CO_2$ that behaves like a gas but has a fluid-like density. Depending on circumstances, supercritical $CO_2$ injection can be favored over injection of gaseous $CO_2$ due to its density allowing for greater storage of $CO_2$ per volume.

Injection of gaseous or supercritical $CO_2$ may occur in porous geological reservoirs (e.g., deep saline aquifers and depleted petroleum fields) below impermeable barriers. Gaseous or supercritical $CO_2$ is more buoyant than formation fluids and can rise upwards where there is permeability in the rock. For durable storage to occur, $CO_2$ must be trapped beneath a structural barrier (e.g., caprock), dissolved into formation water to increase its density, or held in pore space by capillary forces. In all cases, the risk for storage reversals remains high until the rate-limiting step of $CO_2$ entering the dissolved phase is complete, which can take up to 103 years. For this reason, a very thorough reservoir assessment is necessary prior to injecting gaseous or supercritical $CO_2$. An alternative to this methodology is the formation of seltzer at the surface prior to injection. Given the appropriate reservoir conditions, completely dissolved $CO_2$ is denser than formation brine, so it will sink within the reservoir and therefore not migrate upwards risking re-release. This type of $CO_2$ storage is referred to as solubility trapping.

In addition, dissolved $CO_2$ can be injected into reactive rocks and stored via mineral trapping. This type of $CO_2$ storage involves forming carbonate minerals by reacting dissolved inorganic carbon resulting from $CO_2$ dissolution (carbonic acid and bicarbonate) with mineral surfaces containing abundant divalent cations (e.g., mafic and ultramafic formations). The rate of mineralization can vary from 10-3 to 103 years depending on formation temperature, pressure, structure, and composition. Once minerals have crystallized, mineralization is durable on geologic timescales with among the lowest risk for reversal of all carbon storage mechanisms.

The kinetics of the mineralization reaction are a limiting factor when relying on this mechanism for storage. While preliminary findings in the industry estimate that the mineralization process can be 100% complete within two years, these finding involve geologically young formations with fresh mineral reactive surfaces and high geothermal gradients (due to tectonic and/or volcanic activity). Performing mineralization tests in rocks under these conditions ensures that carbonate mineralization proceeds under the best possible circumstances since fresh mineral surfaces and high temperatures increase the subsurface reaction rates, allowing for rapid mineralization.

Many continental and subseafloor mafic and ultramafic formations now being included as potential subsurface storage options are far from volcanic and tectonic activity and thus exhibit low geothermal gradients. If high geothermal gradients are determined to be necessary for sequestering carbon dioxide with a low risk of reversibility, then these potential storage options will have a higher risk of reversal or be infeasible due to low geothermal gradients. The risk of reversal is higher because longer mineralization periods increase the possibility of $CO_2$ degassing in the subsurface, rising to the surface, and re-releasing to the atmosphere. Additionally, these cooler and older formations may have already experienced some degree of carbonation as part of the natural geologic and hydrologic cycles, thus reducing the size of reactive surfaces.

Accordingly, there is a need in the art for improved injection materials, systems, and methods for storing $CO_2$ with a low risk of reversal.

BRIEF SUMMARY

Implementations of the disclosed technology provide devices, systems, and methods for storing carbon dioxide. In various cases the storage is configured to provide long-term isolation from the atmosphere. Various implementations enable storage of $CO_2$ in subsurface locations by, for example, injecting dissolved alkaline carbonates. In various cases similar processes can be used for storing alkaline carbonates in water bodies on land, with or without using an acid to adjust pH.

Various aspects of the disclosed technology present one or more advantages over existing techniques, such as those involving injection of supercritical, seltzer or gaseous $CO_2$. For example, injecting alkaline fluids avoids the energy consumption and capital expense costs needed for compressors to perform the required pressure and temperature manipulation to turn gaseous $CO_2$ into a supercritical fluid, a dissolved fluid, or a compressed gas suitable for injection. In addition, injecting alkaline fluids can avoid potential loss of $CO_2$ at the surface due to mixing and injection operations for supercritical, seltzer or gaseous $CO_2$. Further, alkaline fluids (e.g., sodium carbonate ($Na_2CO_3$) and/or sodium bicarbonate ($NaHCO_3$)) will not degas $CO_2$ if exposed to the atmosphere. Accordingly, transporting captured and/or removed $CO_2$ does not require a dedicated pipeline and additional transportation options are possible. Injecting alkaline fluids into subsurface geological reservoirs (e.g. deep saline aquifers or depleted petroleum reservoirs) also increases the reliability of storage when compared to injecting supercritical, seltzer or gaseous $CO_2$, since the alkaline fluids will be denser and remain trapped below existing formation brines.

Among other advantages, injecting alkaline fluids can in various cases benefit from different regulatory requirements than supercritical, seltzer or gaseous $CO_2$. For example, alkaline fluid injection can in various cases access non-$CO_2$ specific well permitting. In some jurisdictions this type of permitting can be less arduous, time-consuming and expensive than $CO_2$-specific permitting such as the EPA Class VI permit required in the U.S. for supercritical, seltzer or gaseous $CO_2$.

In various implementations alkaline fluid injection can aid in managing reservoir pressure. In such cases, adding alkaline fluids can increase pressure and withdrawing saline fluids can decrease pressure. The withdrawn saline fluids can then be used as an input for direct air capture. As an example, adding alkaline fluids increases pore pressure and withdrawing saline fluid decreases pore pressure as needed for optimized operations and maximized storage capacity.

It can also be advantageous to inject alkaline fluids into mafic and ultramafic formations instead of supercritical, seltzer or gaseous $CO_2$ because the additive saturation of the high alkalinity injection fluids and the high alkalinity mafic and ultramafic formations results in effective, rapid, and durable storage of dissolved inorganic carbon.

In various implementations, electrochemical direct air capture or other carbon removal processes can be used to co-produce alkaline fluids along with other products, including hydrochloric acid (HCl) or other acids. These products can then be used to boost the productivity of injection wells by acting as a desealant in a process called acid stimulation. In various cases hydrochloric and/or other acids can also be used to boost reservoir performance by dissolving minerals in the rock in a process called matrix or fracture acidizing. Further, such acids can also be used to boost mineralization storage performance in mafic or ultramafic rocks by refreshing mineral surfaces and increasing reactive areas in cool formations or those with a degree of carbonation. Such products can also push the cone of mineralization away from the site of injection to keep fluid pathways clear for maximum storage potential. In addition, varying amounts of hydrochloric acid (HCl) or other acids can be safely and effectively injected into the subsurface for scalable disposal, with up to a 100% acid stream depending on subsurface geology.

In various implementations, HCl and/or other acid byproducts from direct air capture and other carbon removal processes can be consumed by injecting the acid(s) in combination with alkaline fluids (e.g., via co- or cyclical injection). Alkaline fluid injection thus provides a solution for disposing of quantities of HCl and other acids created during $CO_2$ removal which are currently a concern for scaling $CO_2$ removal. In addition, injecting alkaline fluids in combination with HCl or other acids instead of supercritical, seltzer or gaseous $CO_2$, makes it possible to PH balance the injection fluids. Such pH balancing can minimize reservoir geochemical interactions, maximize durable carbon storage, and meet regulatory requirements while also consuming the acid byproduct of a carbon removal process.

According to various implementations of the disclosed technology, alkaline carbonates embedded with captured $CO_2$ can also be stored in marine and terrestrial water bodies. Such an approach also provides multiple advantages including, among others, reducing the acidification of the ocean and similar water bodies by enhancing ocean alkalinity, increasing the water bodies' carbon capture capacity, providing readily available storage locations for capture technologies, neutralizing some of the alkalinity with acid without evolving $CO_2$ to balance pH, thus providing a solution for the disposal of acid created by capture technologies, and enhancing carbon capture capacity by dissolving alkaline minerals and other mafic/ultramafic rocks in acid before neutralizing the alkaline carbonates.

Various implementations of the disclosed technology include and/or follow on from a direct air capture process that creates at least two streams. In various cases one stream is a low-carbon acidic solution such as HCl. In various cases a second stream is the result of atmospheric $CO_2$ removal, such as an alkaline solution of $Na_2CO_3$ and $NaHCO_3$.

Implementations of the disclosed technology and described examples may include the use of hardware, a method or process, or computer software on a computer-accessible medium. Various implementations include a system of one or more computers that can be configured to perform particular operations or actions by virtue of having software, firmware, hardware, or a combination of them installed on the system that in operation causes or cause the system to perform the actions. As an example, various implementations may include one or more computers configured to carry out one or more parts of a method for sequestering $CO_2$ by controlling various hardware. One or more computer programs can be configured to perform particular operations or actions by virtue of including instructions that, when executed by data processing apparatus, cause the apparatus to perform the actions.

Several examples will now be discussed according to various aspects of the disclosed technology.

One aspect of the disclosed technology relates to a method for sequestering carbon dioxide. The method includes receiving an alkaline fluid stream comprising carbonate produced by a direct air carbon capture process, the carbonate comprising air-captured $CO_2$, and receiving an acidic stream produced by the direct air carbon capture process. The method further includes producing a PH balanced $CO_2$ stream by mixing the alkaline fluid stream with an acidic mixing portion comprising 0% up to 100% of acidic stream and storing the pH balanced $CO_2$ stream in a storage location comprising at least one of a subsurface location, on land, or in a water body. In various cases the storage location and the pH balanced $CO_2$ stream provide long-term storage of the air-captured $CO_2$.

Implementations according to this aspect of the disclosure may include one or more of the following features. In some cases producing the pH balanced $CO_2$ stream comprises mixing the alkaline fluid stream with the acidic mixing portion in a subsurface chamber. In some cases producing the pH balanced $CO_2$ stream comprises mixing the alkaline fluid stream with the acidic mixing portion on the surface. In some cases producing the pH balanced $CO_2$ stream comprises simultaneously injecting the alkaline fluid stream and the acidic mixing portion into a subsurface chamber. In some cases producing the pH balanced $CO_2$ stream comprises alternately injecting the alkaline fluid stream and the acidic mixing portion into a subsurface chamber. In some cases the method further comprises alternately injecting the alkaline fluid stream and the acidic mixing portion in a low geothermal gradient thereby increasing carbonation of mineral rock to expand a mineralization area.

Various implementations may in some cases further include one or more of the following features. In some cases the method further comprises injecting the alkaline fluid stream and the acidic mixing portion or the pH balanced $CO_2$ stream into a subsurface mafic or ultramafic formation. In some cases the method further comprises mixing the acidic stream with an alkaline mineral before mixing the alkaline fluid stream with the acidic mixing portion. In some cases the method further comprises mixing a nanofiltration sludge produced by the direct air carbon capture process with the alkaline fluid stream, the acidic mixing portion, and an alkaline mineral, wherein the storage location is a water body on land. In some cases the storage location is a water body on land, and wherein the pH balanced $CO_2$ stream increases the alkalinity of the water body thereby increasing the carbon capture capacity of the water body.

In various implementations the method further comprises using the acidic stream to degas $CO_2$ from a water stream, capturing the degassed $CO_2$ with the alkaline fluid stream, thereby forming a bicarbonate stream, and storing the bicarbonate stream on land or in water. In some cases the method further comprises storing the bicarbonate stream in a water body, wherein the bicarbonate stream increases the alkalinity of the water body thereby increasing the carbon capture capacity of the water body. In some cases the method further comprises returning the degassed water stream to the sea, wherein the degassed water stream is capable of absorbing additional $CO_2$ from the atmosphere. In some cases the method further comprises mixing the degassed water stream with an alkaline mineral to increase the alkalinity of the degassed water stream before returning the degassed water stream to the sea.

Another general aspect of the disclosed technology includes a method for sequestering carbon dioxide. The method comprises receiving an alkaline fluid stream comprising carbonate produced by a direct air carbon capture process, the carbonate comprising air-captured $CO_2$, receiving an acidic stream produced by the direct air carbon capture process, producing a pH balanced $CO_2$ stream by mixing the alkaline fluid stream with an acidic mixing portion comprising 0% up to 100% of the acidic stream, and injecting the alkaline fluid stream and the acidic mixing portion into a subsurface storage location comprising a mafic or ultramafic formation. In various cases the storage location and the pH balanced $CO_2$ stream provide long-term storage of the air-captured $CO_2$.

Implementations according to this aspect may include one or more of the following features. In some cases the method further comprises mixing the alkaline fluid stream and the acidic mixing portion before injecting into the subsurface storage location. In some cases the method further comprises simultaneously injecting and mixing the alkaline fluid stream and the acidic mixing portion into the subsurface storage location to produce the pH balanced $CO_2$ stream. In some cases the method further comprises simultaneously injecting the alkaline fluid stream and the acidic mixing portion at a fluid pressure to create seltzer at the location of the injection or during the injection. In some cases the method further comprises dissolving an alkaline material in the acidic stream prior to mixing the alkaline fluid stream with the acidic mixing portion. In some cases the method further comprises mixing olivine with the acidic stream to produce an alkaline chloride solution and mixing the alkaline chloride solution with the alkaline fluid stream.

Several additional examples will now be discussed according to various aspects.

In Example 1, an acidic stream and an alkaline stream in a $CO_2$ removal process yielding an acid and an alkaline solution are injected into mafic and/or ultramafic formations in a repeating dual-stage loop with a first stage and a second stage. In the first stage of the loop, the injection of acid increases permeability and mineral-reactive surface; in the second stage of the loop, the alkaline fluids are injected to facilitate rapid mineralization and long-term carbon storage. In various cases this alternating injection approach reduces risk of reversal and unlocks additional suitable reactive rocks, such as those in low geothermal gradient and/or partially carbonated systems, via the acid's ability to increase mineral reactive surfaces. In various implementations, two continuous or simultaneous injections are mixed in a subsurface chamber. In various cases alkaline and acid streams are mixed on the surface, while avoiding any evolution of $CO_2$, and then injected as a single stream. In various implementations, other similar forms of mixing and injection can be used.

In Example 2, the alkaline stream alone of a $CO_2$ removal process can be injected into geological reservoirs (e.g., deep saline aquifers or depleted petroleum fields) where the alkaline fluid density is greater than the formation fluid density, allowing for gravity separation of the alkaline fluids for durable subsurface carbon storage.

In Example 3, the method in Example 2 in which the alkaline stream of a $CO_2$ removal process can be mixed at the surface with the concentrated or dilute acid stream of a $CO_2$ removal process in such a ratio to pH balance the alkaline stream without evolving gaseous $CO_2$ while maintaining, increasing or decreasing as necessary the density of the alkaline stream for injection into a geological reservoir or mafic/ultramafic formation.

In Example 4, the method in Example 3 in which the alkaline byproduct or the PH-balanced alkaline byproduct is injected into geological reservoirs containing deep saline aquifers to both durably store carbon in the subsurface while also aiding in pressure and flow management for reservoirs in which a carbon dioxide removal process is pumping the saline fluid to utilize it as the input for a carbon dioxide removal process.

In Example 5, the method of Example 1 in which both the alkaline and acidic streams in a $CO_2$ removal process can be injected simultaneously while held at an appropriate pressure to create seltzer at the point of or during injection into mafic and/or ultramafic formations and/or geological reservoirs to either facilitate mineralization in mafic and/or ultramafic formations or to be stored as dissolved $CO_2$ in appropriate geological reservoirs to facilitate durable carbon storage in the subsurface.

In Example 6, the method of Example 5 in which the alkaline stream alone can be injected into mafic or ultramafic formations to facilitate rapid subsurface mineralization and durable carbon storage.

In Example 7, the method of Example 1 in which various alkaline effluents of the $CO_2$ removal processes (such as, among others, nanofiltration reject stream, sludge from chemical softening process) can be injected instead of alkaline carbonates along with the acidic streams of the $CO_2$ removal process to enable the disposal of the acid stream. The alkaline elements in the effluent can also enable additional carbon capture by forming alkaline carbonates either in subsurface locations or also in water bodies and on land.

In Example 8, the method of Example 1 in which additional alkaline materials such as mafic and ultramafic rocks including olivine or sedimentary materials like lime can be dissolved in the acidic stream and then added to the alkaline carbonates to increase the amount of acid that is injected or mixed without the evolution of $CO_2$. The dissolution of alkaline minerals in acid increases the pH thereby allowing large volumes of resulting acidic stream to be used in the neutralization of the alkaline carbonate stream. Furthermore, the alkaline minerals added can increase the $CO_2$ absorption capacity of the resultant liquid.

In Example 9, the method of Example 8 in which olivine, which is rich in magnesium, is mixed with dilute or concentrated hydrochloric acid from the $CO_2$ removal process at room temperatures and pressures or elevated temperatures and pressures to form an alkaline chloride solution, such as magnesium chloride, which is acidic but has higher pH than hydrochloric acid. The alkaline chloride solution is then mixed with sodium carbonate solution from the $CO_2$ removal process to neutralize and store the resulting mixture, including the $CO_2$ captured in the sodium carbonate, in subsurface locations, in water bodies, or on land.

In Example 10, the method of Example 1 in which additional $CO_2$ captured from another process, either direct air capture or point source capture, could be dissolved in the alkaline carbonate stream to form alkaline bicarbonates. The alkaline bicarbonates, with or without the acid stream from the $CO_2$ removal process, can then be stored in subsurface locations, in water bodies, or on land ensuring no $CO_2$ is released as a result of the mixing and storage.

In Example 11, the method of Example 1 in which the $CO_2$ released to facilitate the mineralization in mafic and/or ultramafic formations is of better quality (e.g. low sulfur content) because the pathway-releasing $CO_2$ embedded in alkaline carbonates with acid from the $CO_2$ removal process—is a chemical synthesis resulting in impurities and contaminants removed from the brine (e.g., PFAS, nitrates, hexavalent chromium) staying dissolved in the liquid streams and not getting released with the evolution of $CO_2$.

In Example 12, the method of Example 11 in which the $CO_2$ evolution reaction is exothermic, aiding the mineralization in mafic and/or ultramafic formations. Furthermore, the exothermic reaction can aid in dissolving certain rock formations to enable durable $CO_2$ storage for the released $CO_2$ or the alkaline carbonate liquid that is injected and not neutralized with the acidic stream.

In Example 13, the method of Example 12 in which the alkaline carbonate solution is devoid of divalent ions such as Calcium and Magnesium, which aids in maintaining porosity and permeability by avoiding impairment by calcium and magnesium carbonate deposits.

In Example 14, the acid from the $CO_2$ removal process is used to remove $CO_2$ dissolved in water and utilized to convert the alkaline carbonates from the $CO_2$ removal process to alkaline bicarbonates. The alkaline bicarbonates are stored in subsurface locations or in water bodies or on land and the lean $CO_2$ water is mixed with alkaline mafic or ultramafic minerals, such as, among others, olivine, to increase the pH, and disposed in the water body. The alkaline rock that is added is dissolved in the acidic medium and aids in increasing the carbon capture capacity of the disposed stream.

In Example 15, the method in Example 14 in which the alkaline carbonate or the bicarbonate solution is mixed with the alkaline rock dissolved acidic stream to balance the pH before being released to subsurface locations or in water bodies or on land.

Example 16 includes a method for injection of alkaline fluids into subsurface geological reservoirs or formations of reactive (e.g., mafic and ultramafic) rocks to permanently and irreversibly store $CO_2$ captured from ambient air.

In Example 17, the method in Example 16 wherein the alkaline carbonates and acid streams are injected alternatingly in the low geothermal gradient subsurface to increase the carbonation of mineral rock and to expand the mineralization area.

In Example 18, the method in Example 17, wherein the carbonate and acid streams are injected simultaneously or pulsed or mixed in a structured or unstructured fashion mixing them either in the subsurface or on ground or in the path in-between.

In Example 19, the method in example 17, wherein the pH of the liquid is balanced such that $CO_2$ is not released upon injection and it stays sequestered in the liquid for long durations.

In Example 20, the method of Example 16, wherein the alkaline carbonate stream from the $CO_2$ removal system is dispersed in water bodies on land such that no $CO_2$ evolution occurs, thereby sequestering the captured $CO_2$.

In Example 21, the method of Example 20, wherein the pH of the liquid carbonate stream is balanced with the acid stream from the $CO_2$ removal system.

In Example 22, the method of Example 20, wherein the acid stream is mixed with alkaline minerals before mixing with the liquid carbonate stream for sequestration of captured $CO_2$.

In Example 23, the method of Example 20, wherein other effluent streams from the $CO_2$ removal system such as NF reject sludge are mixed with the alkaline carbonate stream and the acid stream along with alkaline minerals and dispersed in water bodies on land.

In Example 24, the method of Example 20, wherein the increased alkalinity of the water increases the carbon capture capacity of the water body through ocean alkalinity enhancement.

In Example 25, the method of Example 16, wherein the acid stream from the $CO_2$ removal system is used to degas $CO_2$ from the water such as seawater, which is in turn captured in the alkaline carbonate stream from the $CO_2$ removal system forming bicarbonates that can be stored on land or in water.

In Example 26, the method of Example 25, wherein the alkaline bicarbonates are dispersed in water, adding alkalinity to the water body, and increasing the carbon capture capacity through ocean alkalinity enhancement.

In Example 27, the method of Example 25, wherein the $CO_2$-lean seawater is returned to the sea capable of absorbing additional $CO_2$ from the atmosphere.

In Example 28, the method of Example 25, wherein the $CO_2$-lean seawater is mixed with alkaline minerals, increasing the alkalinity of the water and then returned to the sea capable of absorbing additional $CO_2$ from the atmosphere.

In Example 29, the method of Example 28, wherein the bicarbonate stream is mixed with the alkaline minerals dissolved in the $CO_2$-lean seawater before dispersing it to the sea, increasing the carbon capture capacity through ocean alkalinity enhancement.

While multiple implementations and aspects are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
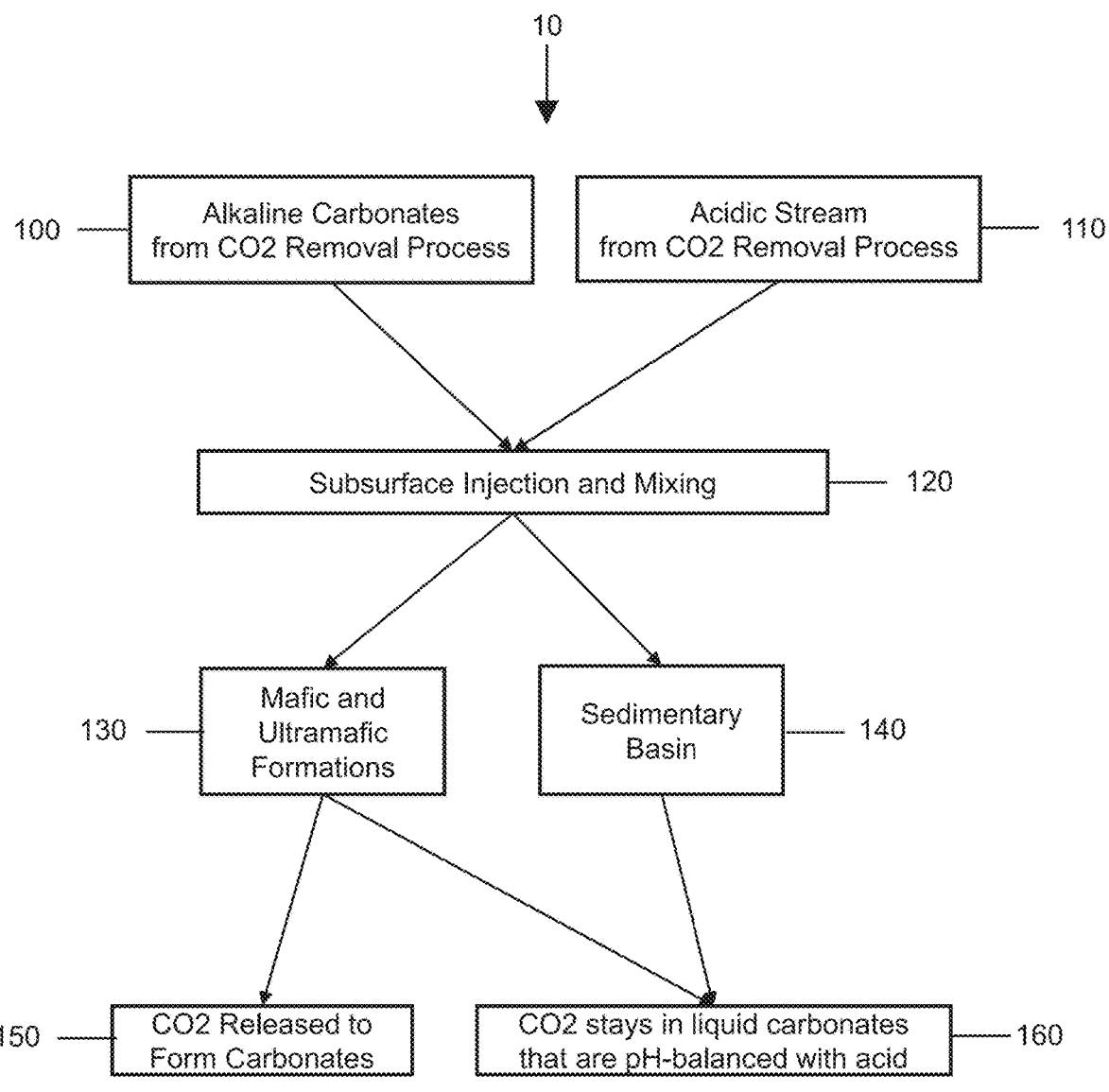
FIG. 1 is a block diagram of a sequestration system and process according to an implementation.

Various examples and implementations disclosed or contemplated herein relate to storing carbon dioxide in conjunction with a carbon dioxide capture system and/or process. Such a system and/or process is alternatively referred to herein as a $CO_2$ removal process. In various implementations, $CO_2$ is stored in subsurface locations, as well as marine and terrestrial water bodies. Possible examples of subsurface storage locations include, but are not limited to, mafic and/or ultramafic rocks, sedimentary basins with deep saline aquifers, and depleted oil and gas reservoirs.

In various cases the carbon dioxide storage or sequestration is configured to be "long-term," meaning that $CO_2$ will remain sequestered for a time period ranging from decades to thousands of years. In various implementations, the long-term carbon storage is configured to maintain sequestration of $CO_2$ for 1,000 years or more. In various cases, the long-term carbon storage is practically permanent and irreversible, similar to how other resources such as natural gas and oil are stored underground through natural, geologic mechanisms.

In various implementations, the $CO_2$ capture system is a direct air carbon capture that uses an electrochemical process to produce a hydroxide-rich stream from an input liquid such as, for example, saline. The hydroxide-rich stream is then used to capture $CO_2$ from air, thus producing an alkaline fluid such as a liquid carbonate fluid or solution. In addition to the alkaline fluid, the carbon capture system may also generate one or more by-products. One possible example includes a hydrogen-rich acid or acidic solution, such as hydrogen chloride.

Various $CO_2$ removal processes produce a stream of solid or liquid carbonates along with an acidic solution. In some cases the acidic solution is used to neutralize an alkaline carbonate solution, thus disposing of some or all of the acidic solution in addition to treating the alkaline carbonate fluid. In certain cases, alkaline minerals-such as mafic or ultramafic rock (e.g., olivine)—are dissolved in the acidic solution before mixing it with the alkaline carbonate solution from the $CO_2$ removal process. The resulting mixture provides storage for the captured $CO_2$ and also increases the potential for capturing additional $CO_2$ from, e.g., a body of water.

Additional embodiments and implementations disclosed or contemplated herein relate to methods and systems to replace or add on a bicarbonate solution or other effluents from the $CO_2$ removal process. Examples include a nanofiltration (NF) reject, sludge from the chemical softening process, and alkaline minerals to be neutralized with the acidic solution from the $CO_2$ removal process. In certain configurations, the acidic solution is first used to release dissolved $CO_2$ which is absorbed to form bicarbonates, and the $CO_2$-lean acidic solution is neutralized using alkaline minerals, with or without a bicarbonate solution, before dispersing it to water bodies on land.

As discussed above, various implementations of the disclosed technology include and/or follow on from a direct air carbon capture system and/or process. Examples of possible carbon capture systems/processes are disclosed in U.S. application Ser. No. 18/082,903, filed Dec. 16, 2022, and entitled "SYSTEMS AND METHODS FOR DIRECT AIR CARBON DIOXIDE CAPTURE," and in U.S. application Ser. No. 18/480,779, filed Oct. 4, 2023, and entitled "SYSTEMS AND METHODS FOR INTEGRATED DIRECT AIR CARBON DIOXIDE CAPTURE AND DESALINATION MINERAL RECOVERY," both of which are hereby incorporated by reference in their respective entireties.

Various implementations can make use of the technologies disclosed in other examples and aspects herein, such that the teachings contained herein all relate to variations on the implementations disclosed elsewhere herein. One of skill in the art would readily appreciate that in certain implementations, features or other aspects disclosed in any specific example detailed herein can be combined with additional features outlined in alternate examples, such that the instant disclosure contemplates combining various features for individual applications of the disclosed technology. In various cases the teachings of one or more implementations disclosed herein can apply and be used with other implementations disclosed herein, as well as with various examples discussed in U.S. application Ser. No. 18/082,903 and U.S. application Ser. No. 18/480,779 noted above.

As described herein, the disclosed technologies are often referred to broadly as a system and/or process, a sequestration system and/or process, or a carbon capture and sequestration system and/or process, though it is understood that this is for brevity and is in no way intended to be limiting to any specific modality.

Various implementations of a sequestration system 10 relate to sequestering $CO_2$ through subsurface injection. Turning to the drawings, FIGS. 1, 2-4, and 5 depict examples of a system for the subsurface injection of alkaline carbonate and acidic solutions, from a $CO_2$ removal process, in mafic or ultramafic formations and/or geological reservoirs. In various cases $CO_2$ is either released to form various forms of carbonate depending on the rock formation or remains dissolved in liquid phase.

FIG. 1 is a block diagram of a sequestration system and process 10 according to various implementations. The system 10 involves the sequestration of $CO_2$ through subsurface injection of the alkaline carbonate solution 100 and acidic solution 110 from the $CO_2$ removal system. In various implementations the subsurface injection 120 includes a dual-mode injection into an underground chamber that alternates between the acid and the alkaline streams. In some cases the subsurface injection 120 includes the simultaneous mixing of the two streams in the underground chamber before it is released.

According to various implementations, the subsurface location includes mafic or ultramafic rock formations 130. In some cases the subsurface location includes one or more sedimentary basins 140. Examples of such basins include, but are not limited to, deep saline aquifers and depleted oil reservoirs. As depicted in FIG. 1, after injection and mixing, in various cases the $CO_2$ (e.g., in a mixture of alkaline fluids and acidic solution) is released and sequestered in the form of other mineral carbonates 150 based on the rock (e.g., mafic, ultramafic) formation or is sequestered in the liquid carbonates 160.

Figure 2:
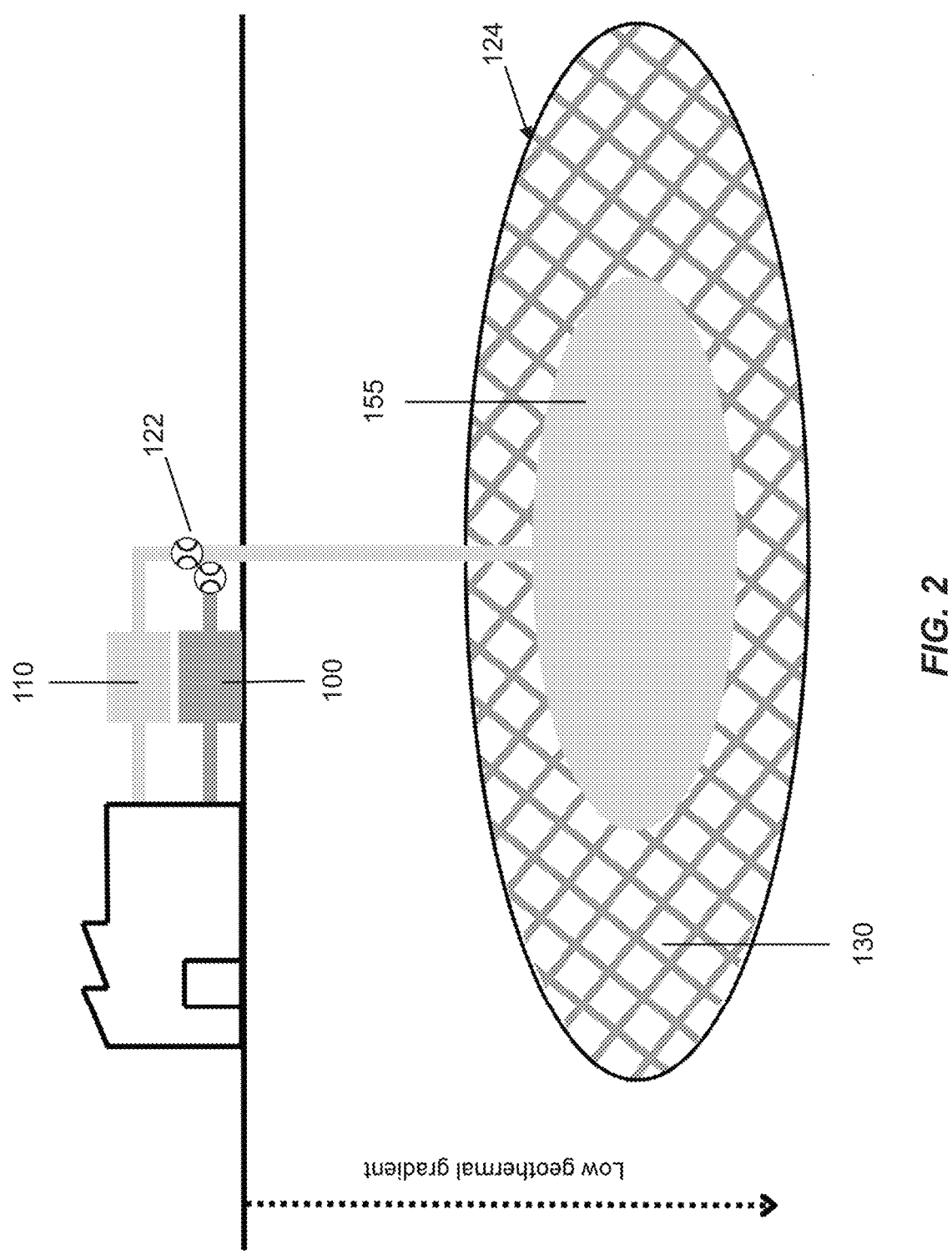
FIG. 2 is a schematic illustration of a geochemical stage according to the sequestration system and process of FIG. 1 according to an implementation.
Figure 3:
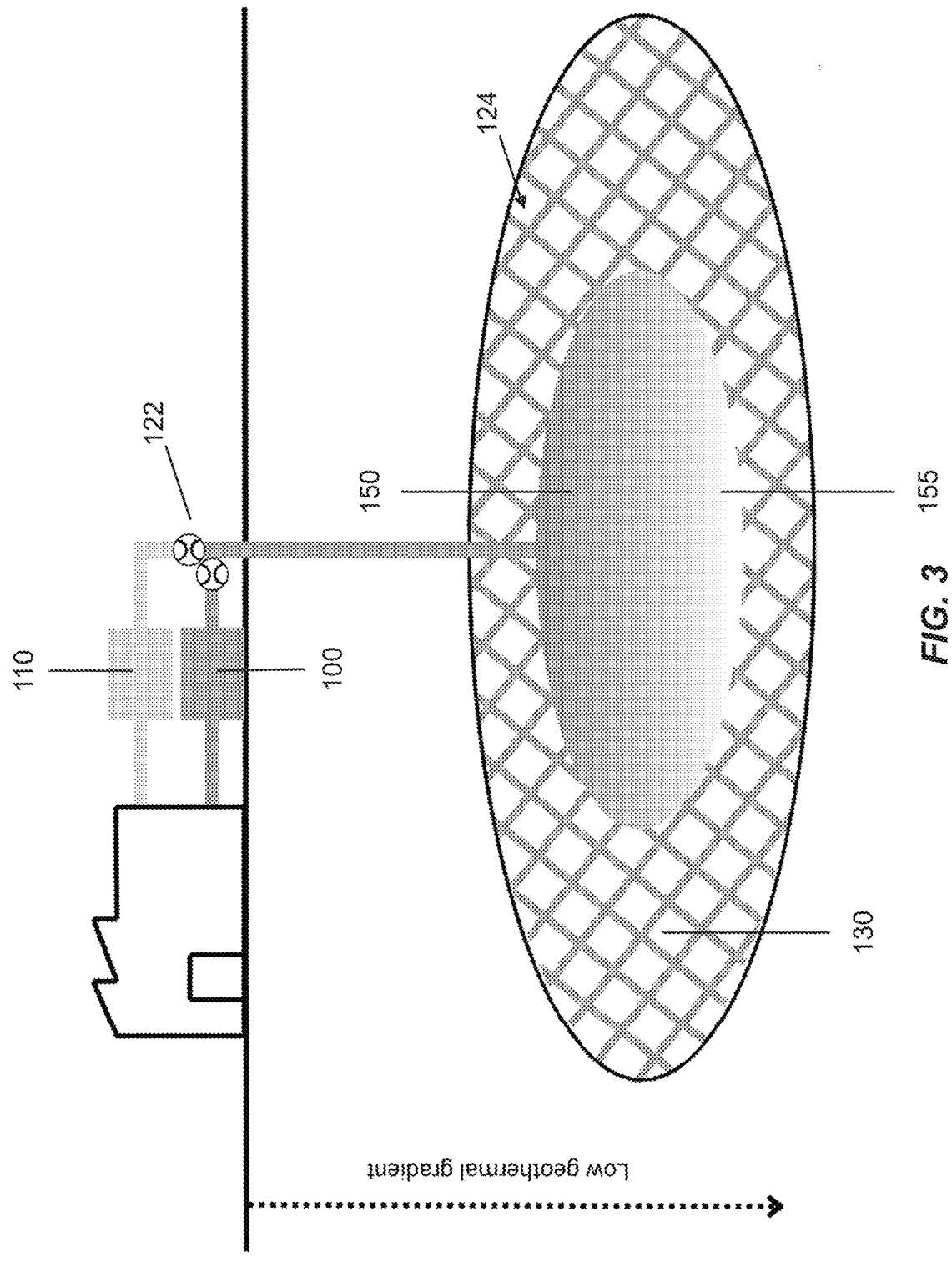
FIG. 3 is a schematic illustration of a geochemical stage according to the sequestration system and process of FIG. 1 according to an implementation.
Figure 4:
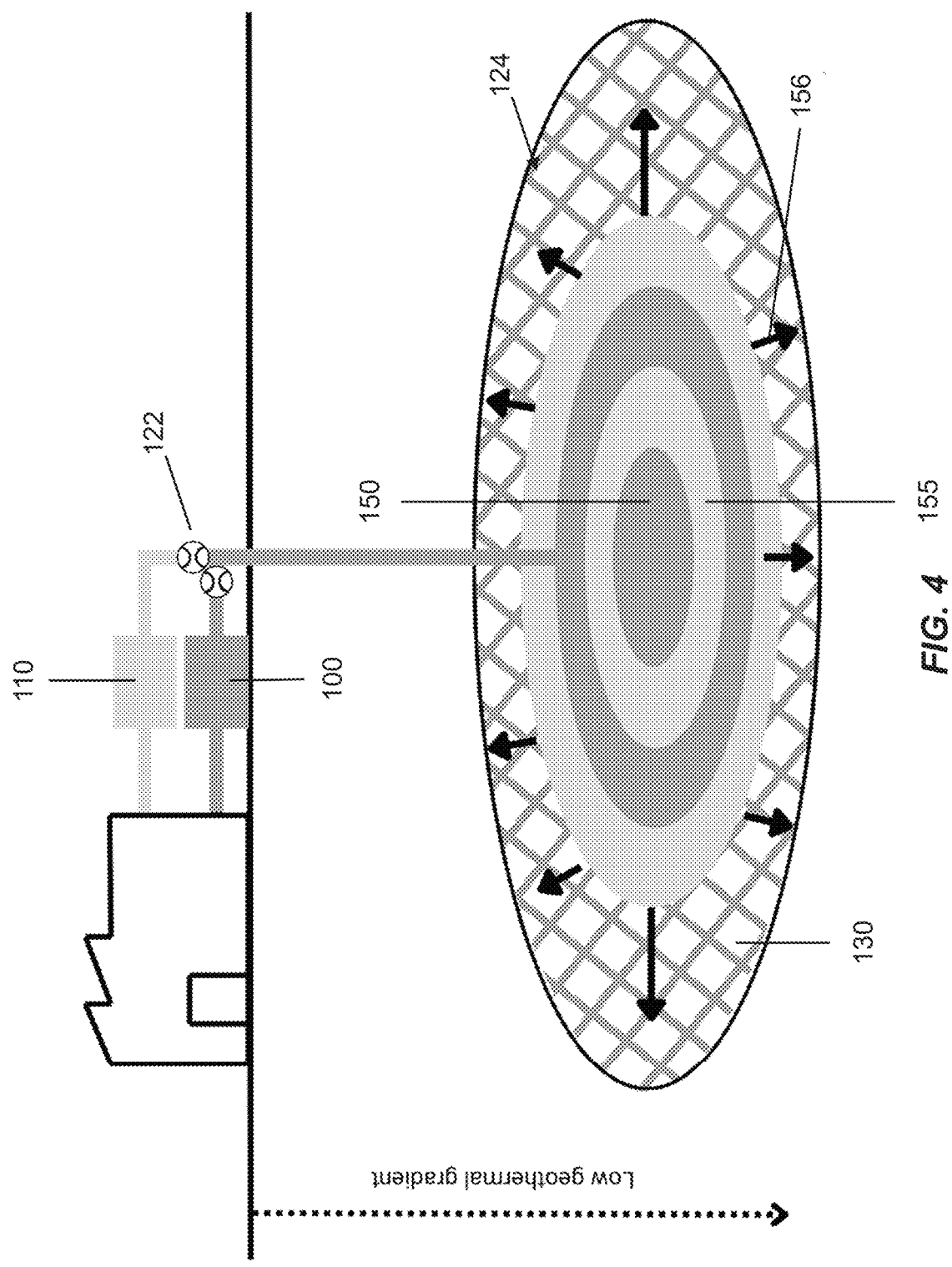
FIG. 4 is a schematic illustration of a geochemical stage according to the sequestration system and process of FIG. 1 according to an implementation.

FIGS. 2-4 depict multiple geochemical stages in an example of the $CO_2$ sequestration process 10 of FIG. 1. According to the depicted implementation, acidic and alkaline carbonate solutions from a $CO_2$ removal system are injected using a 2-way switching valve 122 into a subsurface location with mafic and/or ultramafic rock formations 124. The acidic stream 110 reacts with the mafic and ultramafic rock 124 to expose alkaline minerals 130 (e.g., carbonated basalt pre-acid), thus enabling the carbonation reaction to form mineralized carbonates 150 using $CO_2$ captured from the atmosphere when the alkaline carbonate stream 100 is introduced. The 2-way switching valve 122 alternates between injecting the acidic stream 110 and the alkaline stream 100, thus enabling higher carbonation of the mafic and ultramafic rocks 124 by expanding the pore space and reactive surfaces 155 and expanding the cone of mineralization 156.

Figure 5:
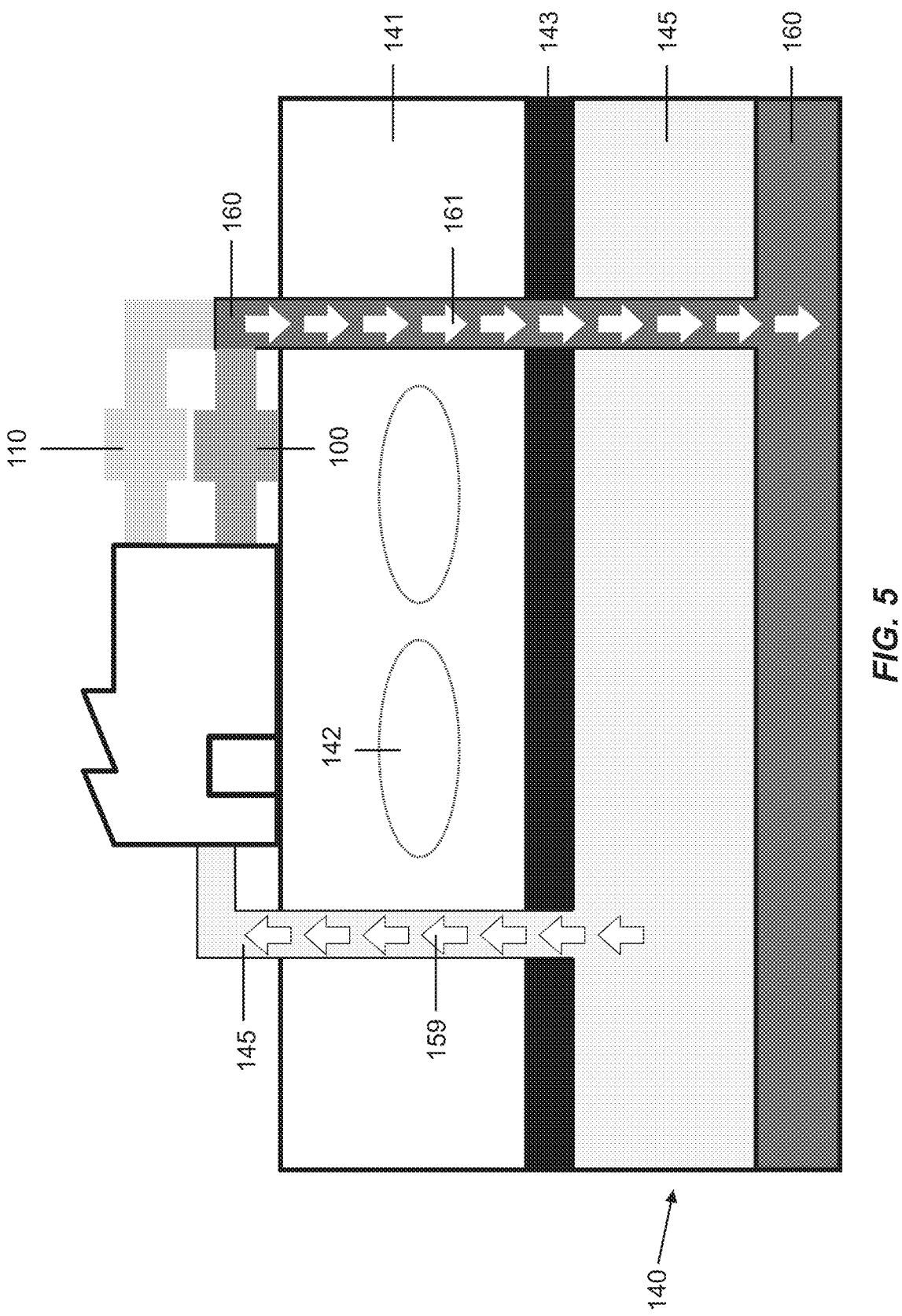
FIG. 5 is a schematic illustration of a system for trapping captured $CO_2$ according to an implementation.

FIG. 5 depicts physical trapping of captured $CO_2$ in the form of alkaline carbonates in deep saline aquifers according to various implementations. In the illustrated example, the acidic stream 110 and the alkaline carbonate 100 solution stream from the $CO_2$ removal system are mixed aboveground (e.g., on the surface) to produce a pH balanced mixed $CO_2$ solution 160. In various cases the pH of the mixed solution 160 is balanced closer to that of a saline aquifer 145 to minimize or eliminate evolution of $CO_2$. In various implementations the acidic and alkaline streams 110, 100, respectively, can be mixed underground. Returning to FIG. 5, the mixed solution 160 is pumped into a sedimentary basin 140 below the sediment deposits 141, shallow groundwater 142, and an impermeable barrier 143 into a deep saline aquifer 145. The injected solution 160 with $CO_2$ dissolved in it has a higher density and sinks to the bottom of the aquifer 145. To ensure that the aquifer pressure remains stable, saline water that is lean in $CO_2$ can be pulled out of the aquifer 145 and used as input for the $CO_2$ removal process. The flow of the saline water 159 is upwards and in the opposite direction of the flow 161 of the injected acid and alkaline carbonate stream. The impermeable barrier 143 physically impedes the vertical migration of $CO_2$ in case it is released from the alkaline carbonates thus ensuring complete sequestration of the captured $CO_2$.

Figure 6:
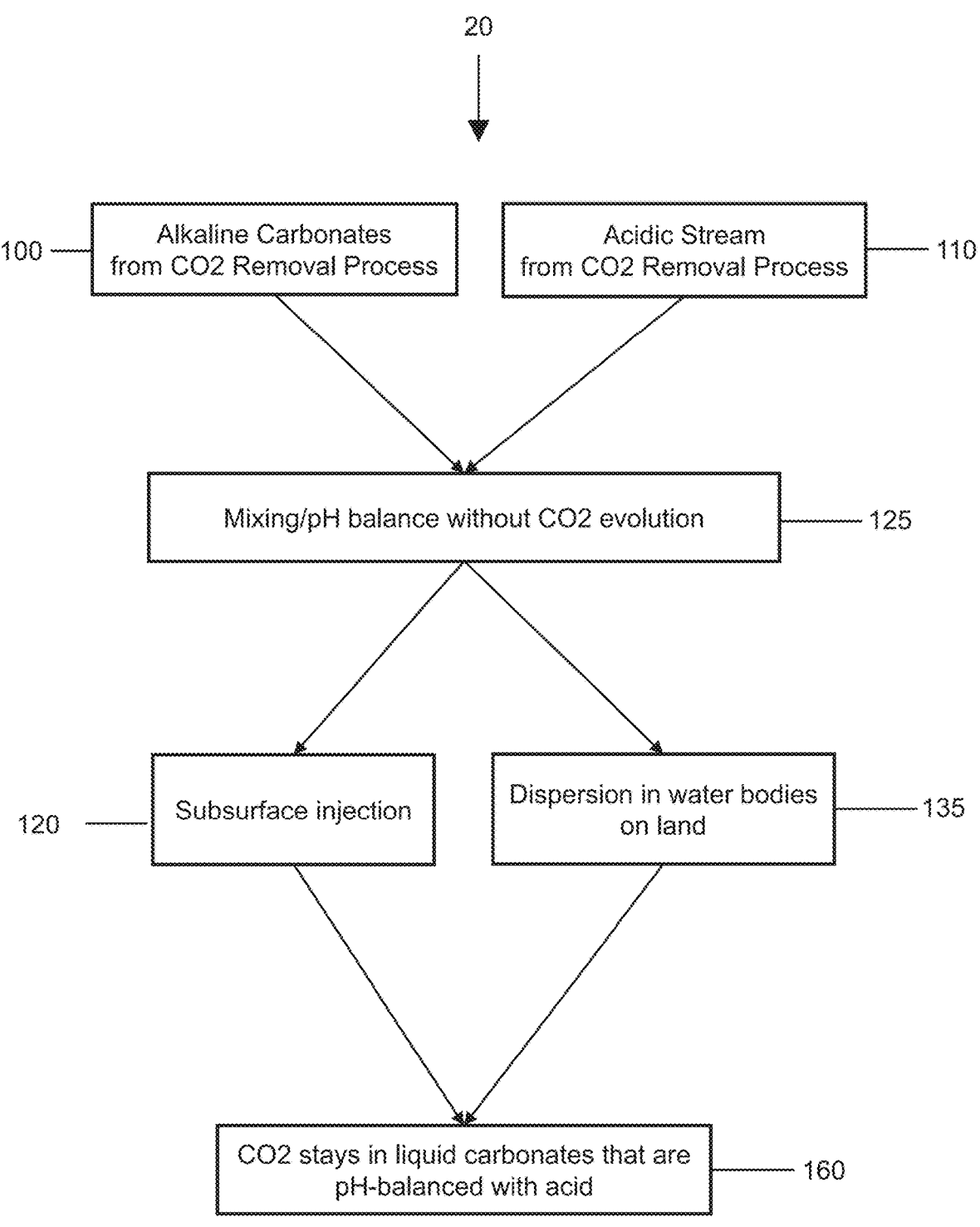
FIG. 6 is a block diagram of a $CO_2$ sequestration system and process according to an implementation.
Figure 7:
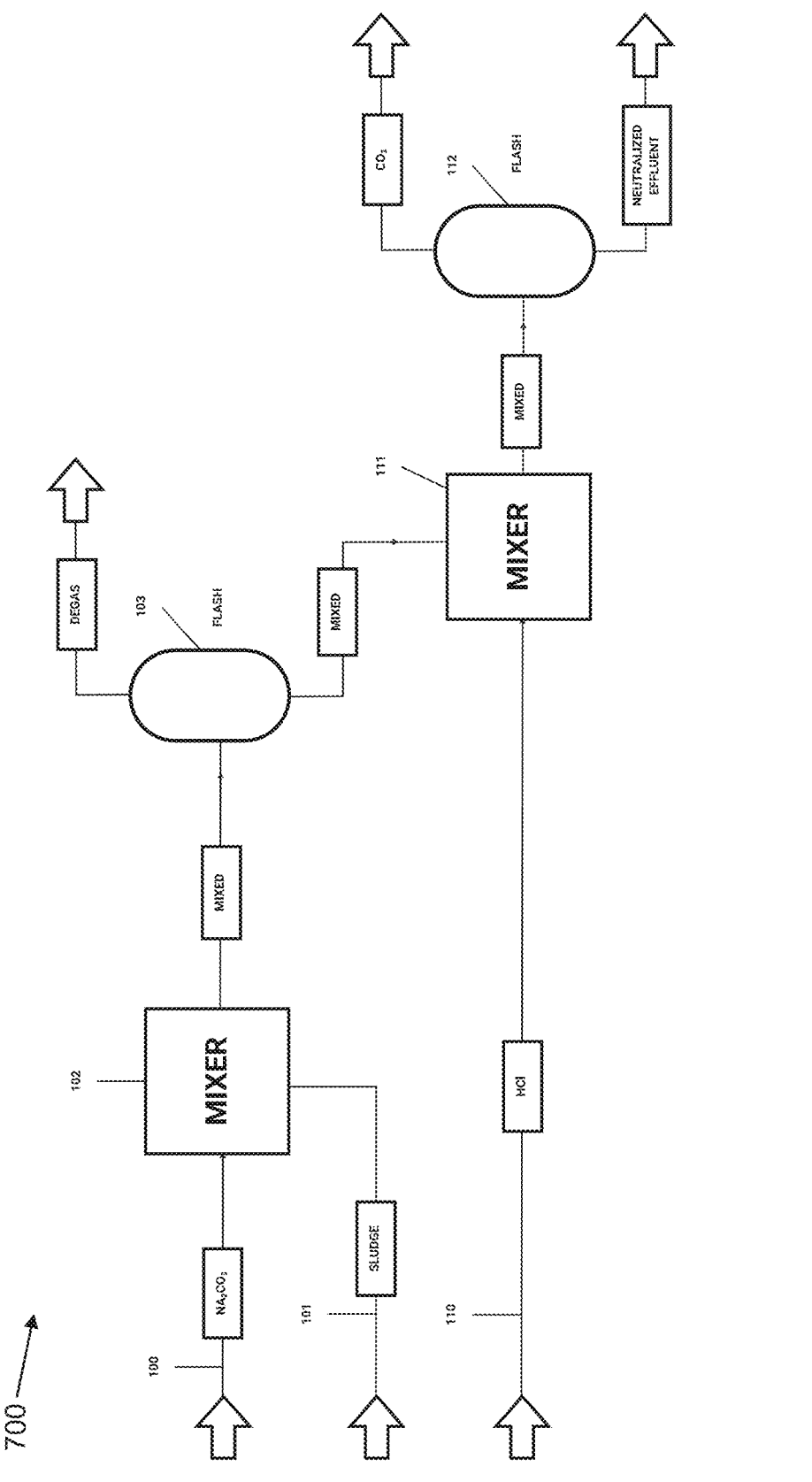
FIG. 7 is a process flow diagram depicting a system and corresponding process for mixing an alkaline carbonate stream with an output from a $CO_2$ removal system according to an implementation.

FIGS. 6 and 7 depict an example of a sequestration system and/or process in which alkaline carbonate and acidic solutions from a $CO_2$ removal process are mixed without the evolution of $CO_2$ and then injected in subsurface locations or in water bodies on land.

FIG. 6 depicts a block diagram of a sequestration system and/or process 20 according to various implementations. In the depicted example, alkaline carbonates 100 formed with a $CO_2$ removal system are stored or sequestered according to one of several optional methods. In various cases alkaline carbonate stream 100 is optionally mixed with the acid stream 110 to varying degrees as necessary to achieve pH balance or neutralization without evolving $CO_2$ 125. For example, in some cases the carbonate stream 100 may be mixed with anywhere from 0% of the acid stream 110 up to 100% of the acid stream 110 to achieve a pH balance. In some cases, the balanced mixture is dispersed in water bodies on land 135 and the captured $CO_2$ is sequestered in the liquid stream 160 while it increases the alkalinity of the water bodies to capture additional $CO_2$. In various implementations the balanced mixture is injected subsurface 120. In the event that some $CO_2$ is released, the underlying rock formation will facilitate carbonation, thus locking the captured $CO_2$ for long duration.

FIG. 7 is a process flow diagram depicting a system 700 and corresponding process for mixing an alkaline carbonate stream 100 with sludge 101 from a $CO_2$ removal system. As an example, in various cases the carbonate stream 100 includes sodium carbonate and the sludge 101 includes various hydroxides, carbonates, and/or other substances filtered by the $CO_2$ removal system. As shown in FIG. 7, the alkaline carbonates 100 and sludge 101 are mixed in a mixer 102 and vented in a vessel 103 to ensure none of the captured $CO_2$ is degassed. This stream is then, if needed, mixed with an acidic stream 110 from the $CO_2$ removal system in another mixer 111 and vented in a vessel 112 to ensure none of the captured $CO_2$ is degassed. According to various implementations, a processing system running modeling software can model the electrolyte concentrations of the acidic 110, alkali carbonate 100, and sludge 101 streams and evaluate if $CO_2$ is degassed due to the mixing of these streams. In various cases this method can ensure the balancing of the pH and sequestration of the $CO_2$ in the liquid stream so that can be stored in the subsurface or in water bodies on land.

Figure 8:
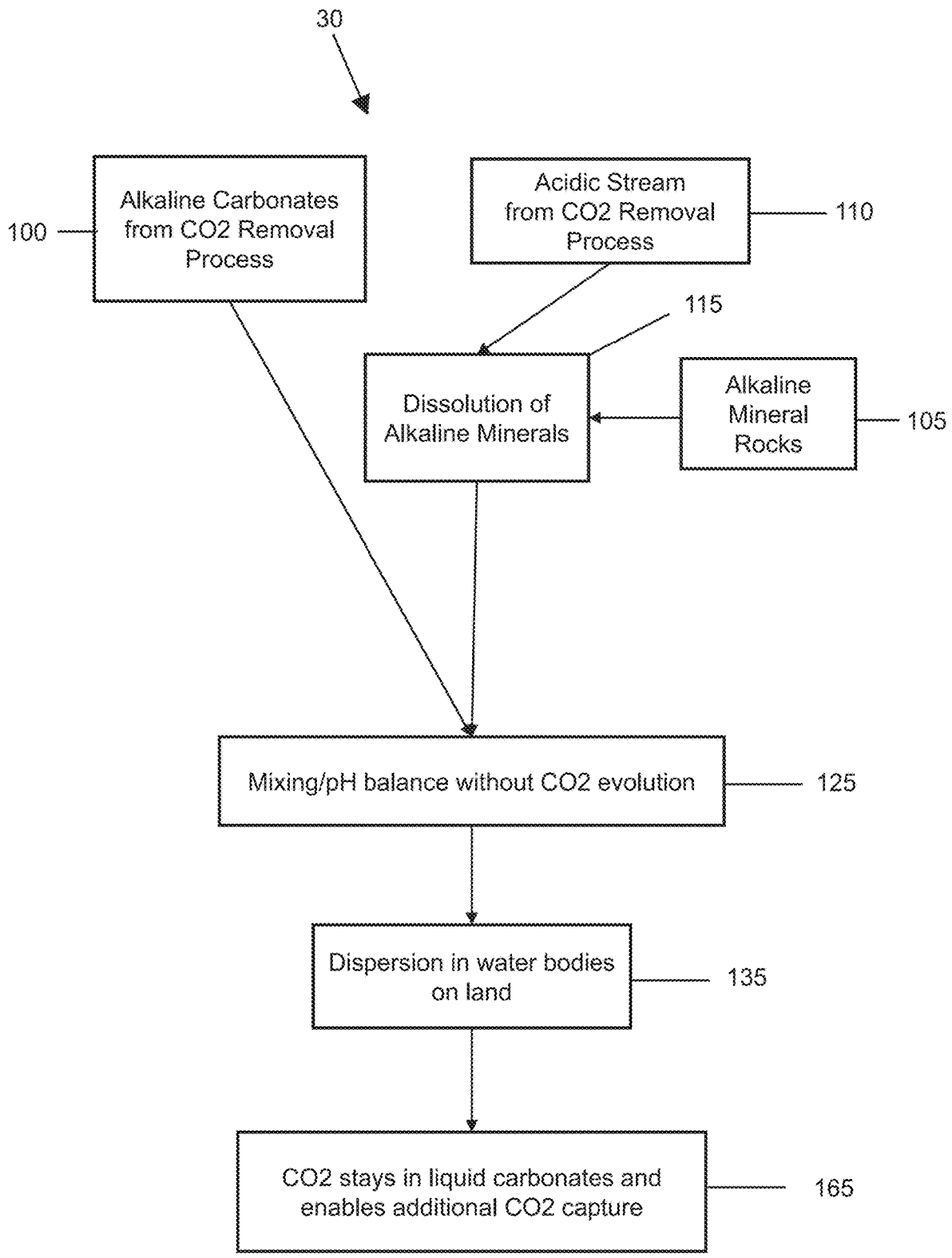
FIG. 8 is a block diagram of a $CO_2$ sequestration system according to an implementation.
Figure 9:
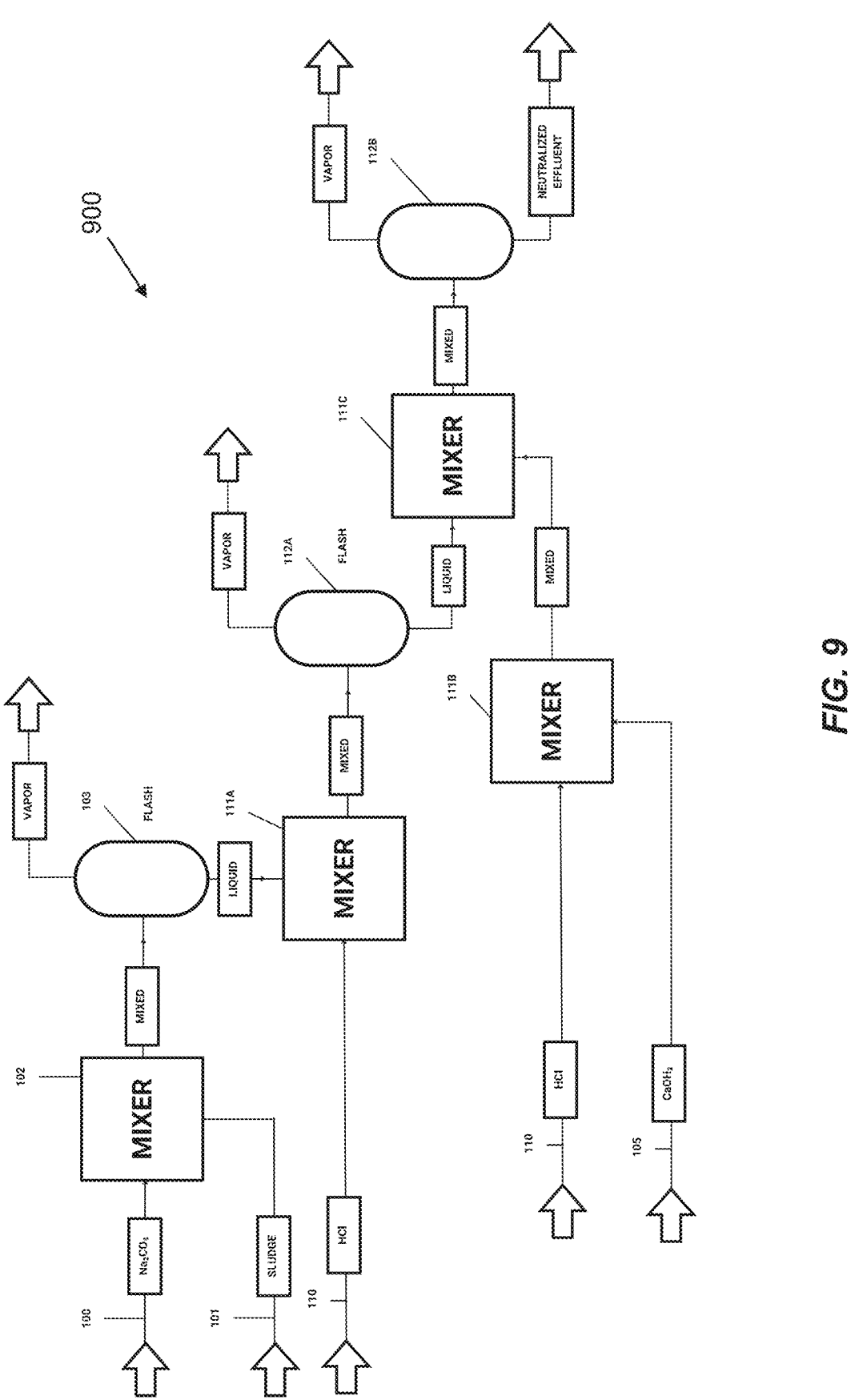
FIG. 9 is a process flow diagram depicting a system and corresponding process for mixing an alkaline carbonate stream with an output from a $CO_2$ removal system and an alkaline mineral stream according to an implementation.

FIGS. 8 and 9 depict an example of a $CO_2$ sequestration system and process in which alkaline mineral rock is dissolved in an acidic solution from a $CO_2$ removal process. The resulting liquid is mixed with carbonates and dispersed in water bodies on land, thus storing the captured $CO_2$ and enabling additional $CO_2$ capture.

Turning to FIG. 8, an example of a $CO_2$ sequestration system 30 is depicted according to various implementations. In this example, alkaline mineral rocks 105 are mixed with the acid stream 110 from the $CO_2$ removal system. The mixture results in the dissolution 115 of the alkaline rock, thus increasing the solution's alkalinity and pH. This solution with dissolved alkaline minerals is then mixed with an alkaline carbonate stream 100 to form a liquid carbonate solution with a balanced pH while ensuring no $CO_2$ is released 125. The liquid carbonate solutions can be dispersed in water bodies on land 135 while simultaneously sequestering the $CO_2$ captured from the removal process and enabling additional $CO_2$ capture from the water bodies 165.

FIG. 9 is a process flow diagram depicting a system 900 and corresponding process, similar to FIG. 7, with the addition of an alkaline mineral stream 105, such as calcium hydroxide, mixed with the acid stream 110 from the $CO_2$ removal system to form alkaline chloride in a mixer 111B before further mixing with the liquid carbonate stream, as in FIG. 7, in mixer 111C. The resulting solution is settled in a vessel 112B and checked for any $CO_2$ degassing. In various implementations software modeling that incorporates the properties of the electrolyte solutions can determine that no $CO_2$ gas is released due to mixing of the alkaline carbonates, sludge, alkaline mineral, and the acid streams so that the resulting liquid stream can be dispersed in water bodies on land while simultaneously sequestering the captured $CO_2$.

FIGS. 10, 11, 12, and 13 depict examples of $CO_2$ sequestration systems and processes in which an acidic solution from a $CO_2$ removal process is utilized to release $CO_2$ from water or $CO_2$ derived from an additional atmospheric air or concentrated $CO_2$ source. The $CO_2$ is captured in a carbonate solution from the $CO_2$ removal process to form bicarbonates. A $CO_2$ lean acidic solution is mixed with alkaline minerals, such as olivine, to neutralize the stream before sending it back to marine and terrestrial water bodies. In various cases the bicarbonate solution is either stored on land or mixed with the alkaline mineral rock acidic stream to further neutralize the stream before sending it back to water bodies on land.

Figure 10:
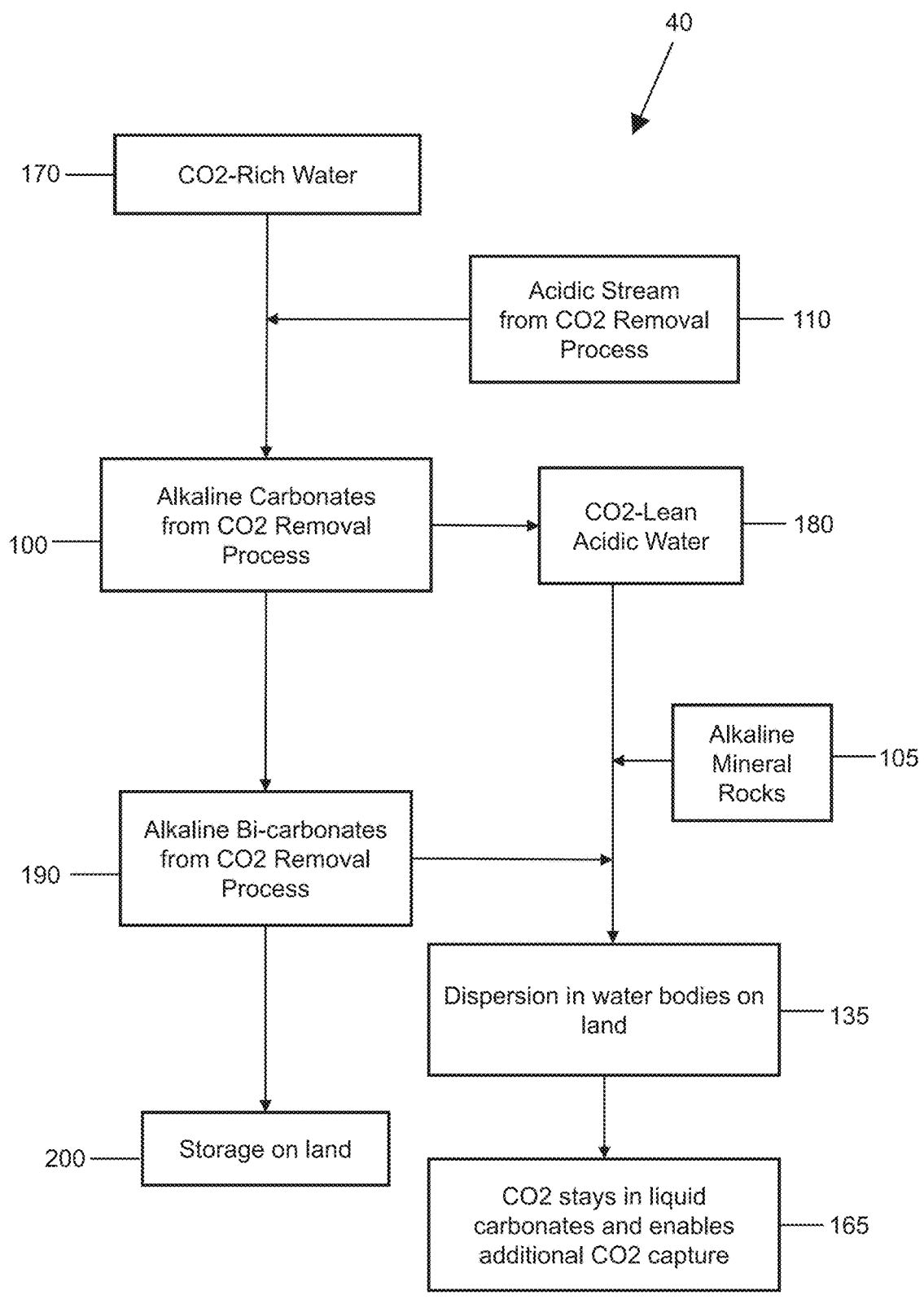
FIG. 10 depicts a carbon sequestration system and process according to an implementation.

FIG. 10 depicts a carbon sequestration system 40 according to various implementations in which $CO_2$-rich water 170, such as seawater, is mixed with the acid stream 110 from the $CO_2$ removal system to release $CO_2$ dissolved in the water 170. the released $CO_2$ is then mixed with the alkaline carbonate stream 100 from the $CO_2$ removal system to form alkaline bicarbonates 190, which can be stored on land 200 or dispersed in water bodies on land 135. In various cases the $CO_2$-lean acid water solution 180 is mixed with alkaline mineral rocks 105 and mixed with the alkaline bicarbonate solution 190 for pH balance before dispersing it in water bodies on land 135. The $CO_2$ captured from the air and the water stays in the liquid carbonate streams, thus sequestering the captured $CO_2$ for a long duration 165. In various cases the liquid solution also increases the alkalinity of the water bodies, allowing additional molecules of $CO_2$ from the air to be captured by water through ocean alkalinity enhancement.

Figure 11:
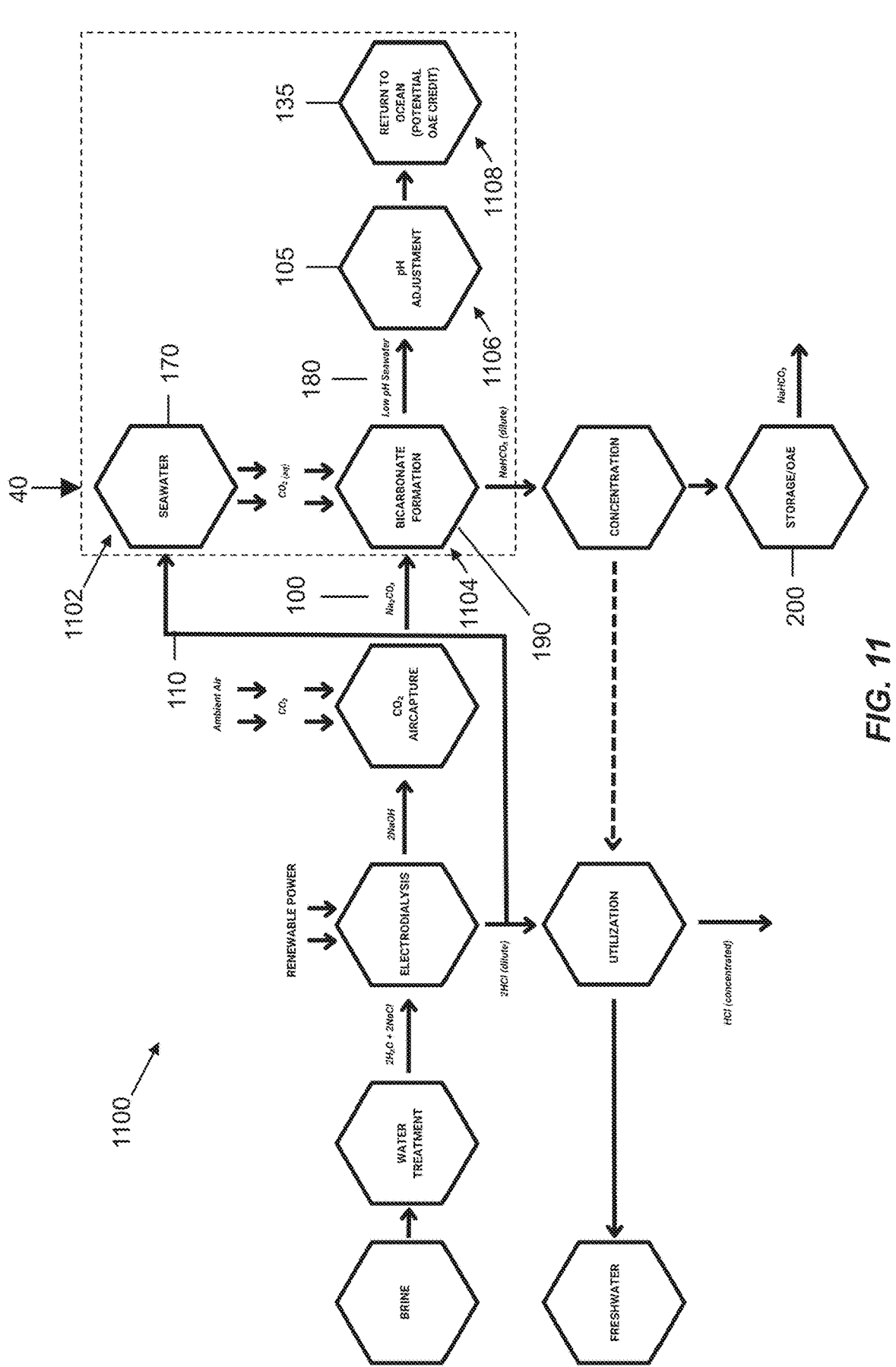
FIG. 11 is a flow diagram of a system for capturing $CO_2$ from air and carrying out the carbon sequestration process of FIG. 10 according to an implementation.

FIG. 11 is a flow diagram that depicts a system 1100 for capturing $CO_2$ from air and carrying out the carbon sequestration system and process 40 shown in FIG. 10 using the acidic and alkaline streams from the $CO_2$ removal system according to various implementations. A first step 1102 is mixing the acidic stream 110 from $CO_2$ removal system with seawater 170 to release the $CO_2$ that is dissolved in water. A second step 1104 is mixing the $CO_2$ released from the seawater with the alkaline carbonate stream 100 from the $CO_2$ removal system to form alkaline bicarbonates 190. The alkaline bicarbonates 190 can be concentrated and stored on land 200 or dispersed in water bodies on land 135 to increase alkalinity levels thereby increasing the $CO_2$ absorption capacity of the water bodies. In a third step 1106, the $CO_2$-lean seawater is mixed with alkaline rock 105, such as mafic/ultramafic rocks, to increase its pH and alkalinity before returning 1108 the solution back into the sea 135. The alkaline rock increases the alkalinity levels of the water, thereby increasing the $CO_2$ absorption capacity of the water body.

According to one possible example, carrying out the process 40 involves first adding HCl to the seawater to decrease the pH to about 5 or 6, at which aqueous $CO_2$ species predominate. Next, low pH seawater is flowed through stacks of gas-permeable hollow fiber membrane tubes (similar to air contactors) filled with $Na_2CO_3$, which is evolved from $NaHCO_3$ through contact with diffused $CO_2$. In the third step, low pH seawater is pH adjusted through alkalinization with mafic/ultramafic rocks. In the fourth step, $CO_2$ lean seawater with about a pH of 8.1 is returned to the ocean.

Figure 12:
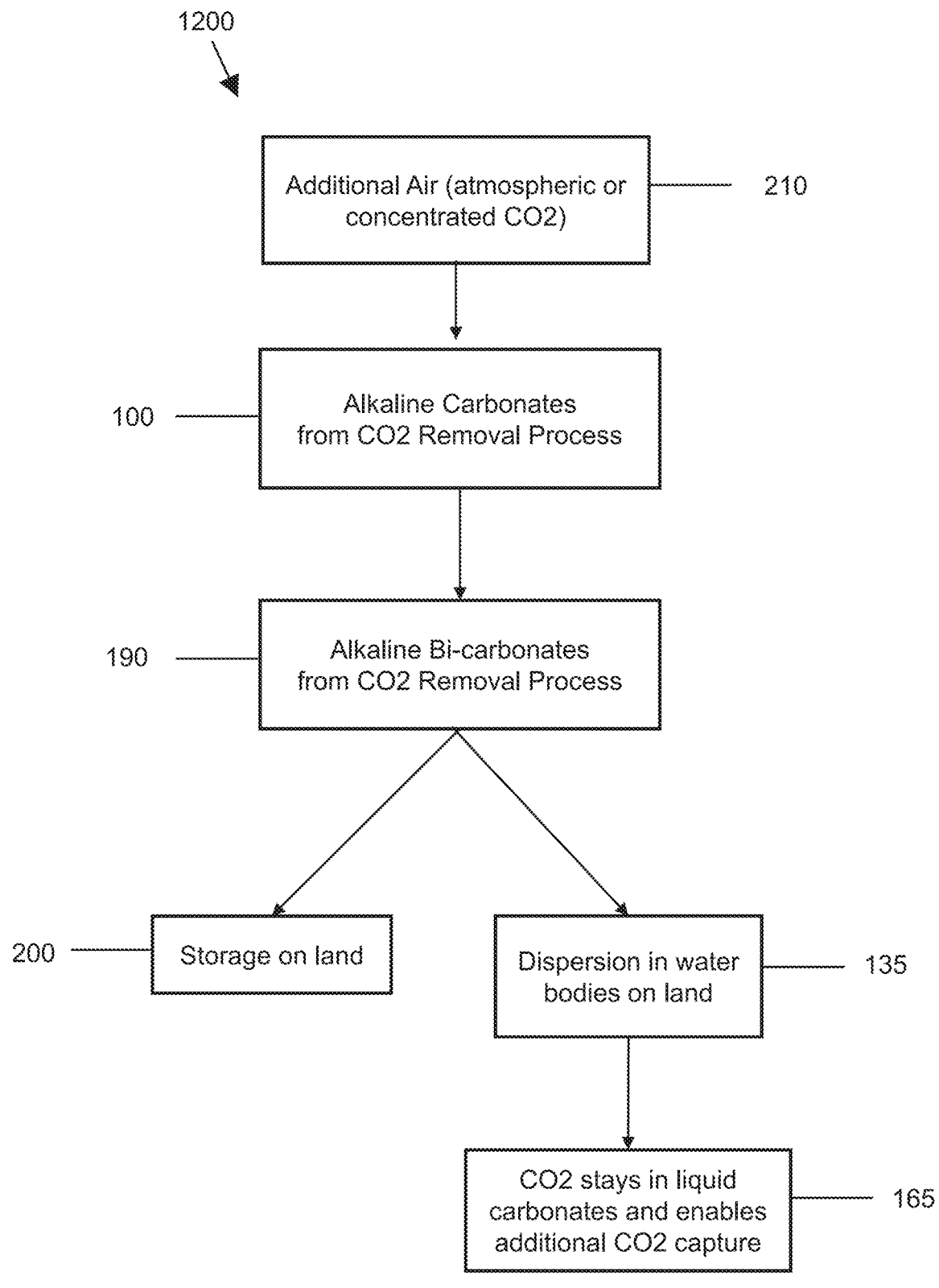
FIG. 12 depicts a carbon sequestration system and process according to an implementation.

FIG. 12 depicts a carbon sequestration system 1200 similar to the system 40 of FIG. 10 according to various implementations. In this example, the system is slightly modified so that additional air 210 rather than $CO_2$-rich water 170 is mixed with the alkaline carbonate stream from the $CO_2$ removal system 100 to form alkaline bicarbonates 190, which can be stored on land 200 or dispersed in water bodies on land 135. The captured $CO_2$ from air and water stays in the liquid carbonate streams sequestering the captured $CO_2$ for a long duration 165. The liquid solution, also, in certain cases increases the alkalinity allowing additional molecules of $CO_2$ from the air to be captured by water through ocean alkalinity enhancement.

Figure 13:
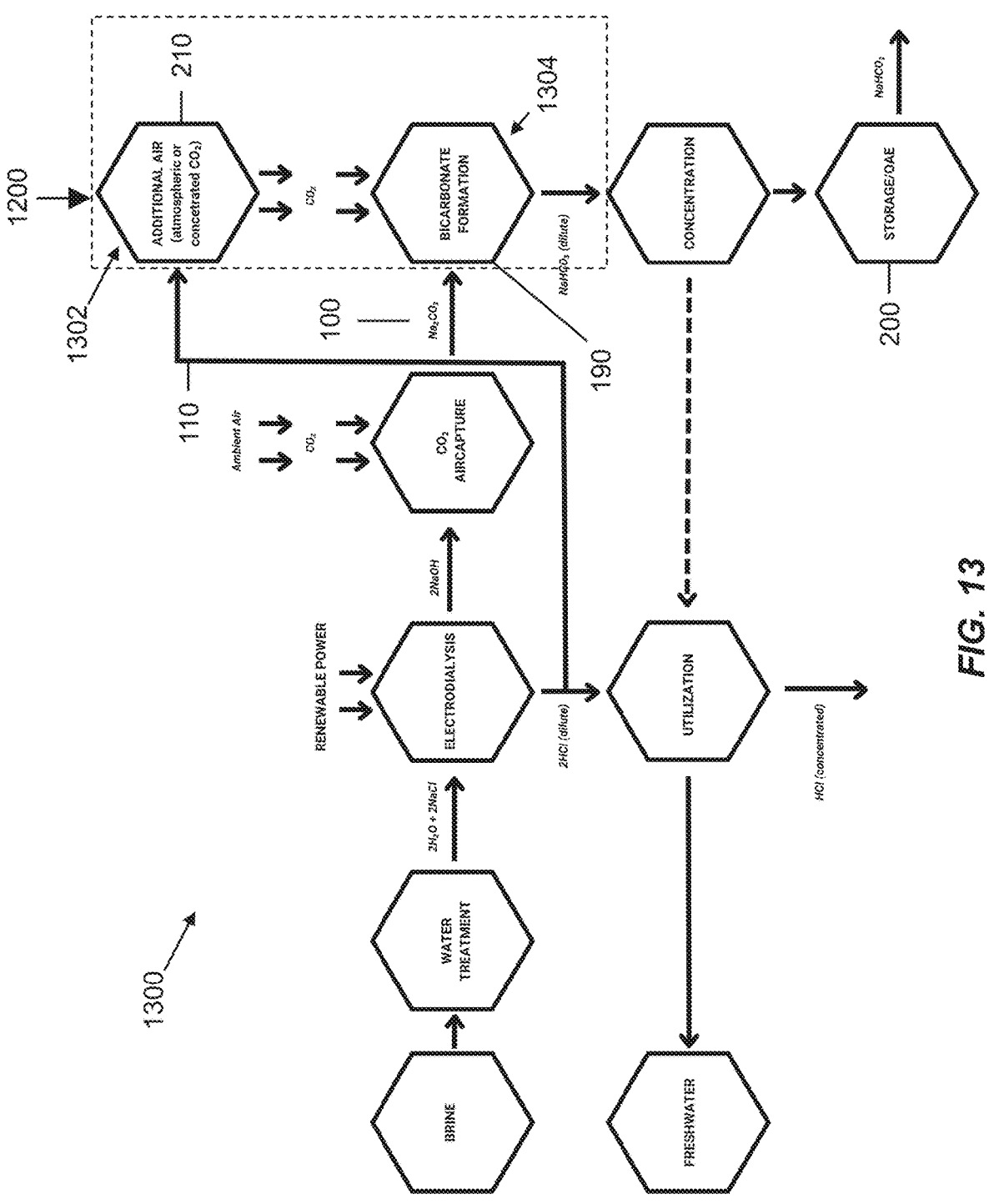
FIG. 13 is a flow diagram of a system for capturing $CO_2$ from air and carrying out the carbon sequestration process of FIG. 12 according to an implementation.

FIG. 13 is a flow diagram that depicts a system 1300 for capturing $CO_2$ from air and carrying out the implementation of the carbon sequestration system 1200 of FIG. 12 using additional air 210 to form alkaline bicarbonates 190. The first step 1302 is capturing additional air 210 in the form of atmospheric air or concentrated $CO_2$. The second step 1304 is mixing this $CO_2$ with the alkaline carbonate stream 100 from the $CO_2$ removal system to form alkaline bicarbonates 190. The alkaline bicarbonates can be concentrated and stored on land 200 or dispersed in water bodies on land to increase alkalinity levels thereby increasing the $CO_2$ absorption capacity of the water bodies.

Although the disclosure has been described with reference to certain implementations and embodiments, persons skilled in the art will recognize that changes may be made in form and detail without departing from the spirit and scope of the disclosed apparatus, systems and methods.

What is claimed is:

1. A method for sequestering carbon dioxide ($CO_2$), comprising:
   receiving an alkaline fluid stream comprising carbonate produced by a direct air carbon capture process, the carbonate comprising air-captured $CO_2$,
      wherein the direct air carbon capture process comprises using an electrochemical process to produce a hydroxide-rich stream from an input liquid and to produce an acidic stream, and using the hydroxide-rich stream to capture $CO_2$ from air, thus producing the alkaline fluid stream comprising the carbonate;
   receiving the acidic stream produced by the direct air carbon capture process;
   producing a pH balanced $CO_2$ stream comprising mixing the alkaline fluid stream with an acidic mixing portion comprising 0% up to 100% of the acidic stream by alternately injecting the alkaline fluid stream and the acidic mixing portion into a subsurface location; and
   storing the pH balanced $CO_2$ stream in a storage location comprising the subsurface location;
   wherein the storage location and the pH balanced $CO_2$ stream provide long-term storage of the air-captured $CO_2$ comprising sequestration of the air-captured $CO_2$ for a time period ranging from decades to thousands of years.

2. The method of claim 1, further comprising alternately injecting the alkaline fluid stream and the acidic mixing portion thereby increasing carbonation of mineral rock to expand a mineralization area.

3. The method of claim 1, further comprising injecting the alkaline fluid stream and the acidic mixing portion into a subsurface mafic or ultramafic formation.

4. The method of claim 1, further comprising mixing the acidic stream with an alkaline material before mixing the alkaline fluid stream with the acidic mixing portion.

5. The method of claim 4, wherein the alkaline material comprises mafic or ultramafic rocks.

6. The method of claim 4, wherein the alkaline material comprises olivine.

7. The method of claim 4, wherein the alkaline material comprises sedimentary material.

8. The method of claim 1, wherein alternately injecting the alkaline fluid stream and the acidic mixing portion comprises a repeating loop comprising first injecting the acidic mixing portion and then injecting the alkaline fluid stream.

9. The method of claim 1, wherein the storage location comprises a sedimentary basin.

10. The method of claim 9, wherein the sedimentary basin comprises a saline aquifer.

11. The method of claim 9, wherein the sedimentary basin comprises a depleted oil reservoir.

12. The method of claim 1, further comprising dissolving additional $CO_2$ in the alkaline fluid stream to form alkaline bicarbonates.

13. A method for sequestering carbon dioxide ($CO_2$), comprising:

receiving an alkaline fluid stream comprising carbonate produced by a direct air carbon capture process, the carbonate comprising air-captured $CO_2$, wherein the direct air carbon capture process comprises using an electrochemical process to produce a hydroxide-rich stream from an input liquid and to produce an acidic stream, and using the hydroxide-rich stream to capture $CO_2$ from air, thus producing the alkaline fluid stream comprising the carbonate;

receiving an acidic stream produced by the direct air carbon capture process;

producing a pH balanced $CO_2$ stream by mixing the alkaline fluid stream with an acidic mixing portion comprising 0% up to 100% of the acidic stream;

injecting the alkaline fluid stream and the acidic mixing portion into a subsurface storage location comprising a mafic or ultramafic formation; and simultaneously injecting the alkaline fluid stream and the acidic mixing portion at a fluid pressure to create seltzer at the subsurface storage location of the injection or during the injection, wherein the subsurface storage location and the pH balanced $CO_2$ stream provide long-term storage of the air-captured $CO_2$ comprising sequestration of the air-captured $CO_2$ for a time period ranging from decades to thousands of years.

14. The method of claim 13, further comprising dissolving an alkaline material in the acidic stream prior to mixing the alkaline fluid stream with the acidic mixing portion.

15. The method of claim 13, further comprising mixing olivine with the acidic stream to produce an alkaline chloride solution and mixing the alkaline chloride solution with the alkaline fluid stream.

\* \* \* \* \*